United States Patent [19]
Ochiai et al.

[11] Patent Number: 5,154,216
[45] Date of Patent: Oct. 13, 1992

[54] RADIAL TIRE FOR HEAVY DUTY VEHICLES

[75] Inventors: Kiyoshi Ochiai, Kobe; Rie Miyawaki, Akashi, both of Japan

[73] Assignee: Sumitomo Rubber Industries, Ltd., Hyogo, Japan

[21] Appl. No.: 636,699

[22] Filed: Jan. 2, 1991

[30] Foreign Application Priority Data

Jan. 5, 1990 [JP] Japan .................................. 2-764

[51] Int. Cl.$^5$ ...................... B60C 11/06; B60C 11/12
[52] U.S. Cl. ......................... 152/209 R; 152/DIG. 1
[58] Field of Search ......... 152/209 R, 209 D, DIG. 1

[56] References Cited

U.S. PATENT DOCUMENTS

| | | | |
|---|---|---|---|
| 2,779,378 | 1/1957 | Robertson | 152/209 R |
| 3,055,410 | 9/1962 | Caulkins | 152/209 R |
| 3,559,711 | 2/1971 | Schelkmann | 152/209 R |
| 3,831,654 | 8/1974 | Boileau | 152/209 R |
| 4,630,661 | 12/1986 | Stelzer | 152/209 R |
| 4,747,435 | 5/1988 | Trabandt et al. | 152/209 R |
| 4,815,511 | 3/1989 | Brayer et al. | 152/209 R |
| 5,012,847 | 5/1991 | Fukumoto et al. | 152/209 R |

FOREIGN PATENT DOCUMENTS

| | | | |
|---|---|---|---|
| 3603034 | 8/1986 | Fed. Rep. of Germany | 152/209 R |
| 46-4553 | 11/1971 | Japan | |
| 51-15282 | 5/1976 | Japan | |
| 61-92902 | 5/1986 | Japan | |
| 0115703 | 6/1986 | Japan | 152/209 R |
| 0178205 | 8/1986 | Japan | 152/209 R |

Primary Examiner—John J. Gallagher
Assistant Examiner—Nancy T. Krawczyk
Attorney, Agent, or Firm—Birch, Stewart, Kolasch & Birch

[57] ABSTRACT

A radial tire for heavy duty vehicles has a tread surface provided with at least a main groove (4) extending in the tire circumferential direction, a slot (9) with a slot width (HS) of 3 to 6 mm, and siping (11). A groove bottom (3) of the main groove (4) is in a zigzag form, and a groove upper edge line (8) of the main groove (4) on the tread surface has outer and inner groove upper edge line (M1, V1) repeated alternately and each extending in the tire circumferential direction. The distance (hu) in the tire axial direction between the outer and inner groove upper edge lines (M1, V1) is smaller than the deflection width (hl) of the zigzag groove bottom. The groove wall of the main groove (4) has hill protrusions (6) each having an inclined groove wall part (5) extending from the external angle portion (M) of the zigzag groove bottom to the outer groove upper edge line (M1). The slot (9) is formed in the inclined groove wall part (5) with the depth (DS) in the tire axial direction from the inclined groove wall part (5) increasing gradually inward in the tire radial direction. The siping (11) is formed in the inside wall (10) of the slot (9) with the depth (DC) in the tire axial direction from the inside wall (10) being constant or increasing gradually inward in the tire radial direction.

1 Claim, 10 Drawing Sheets

WET BRAKE PERFORMANCE (INDEX)

RADIAL TIRE FOR HEAVY DUTY VEHICLES

The present invention relates to a radial tire for heavy duty vehicles capable of suppressing the generation of track wear, and of enhancing the wet resistance and grip performance in the intermediate and terminal phases of wear of the tread surface.

BACKGROUND OF THE INVENTION

A tire enhanced in traction performance and brake effect by forming the zigzag shaped main groove on the tread surface in the circumferential direction is known. It is also proposed to enhance the wet resistance performance and steering stability of a tire in the intermediate and terminal phase of the wear of the tread surface, by defining the deflection width of zigzag at the groove bottom greater than the deflection width at the tread surface, in the main groove, so as to reduce the track wear.

Figure 9A:
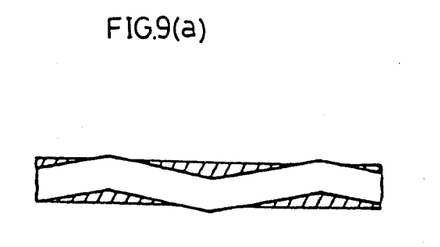
Figure 9B:
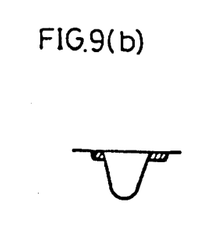
Figure 9C:
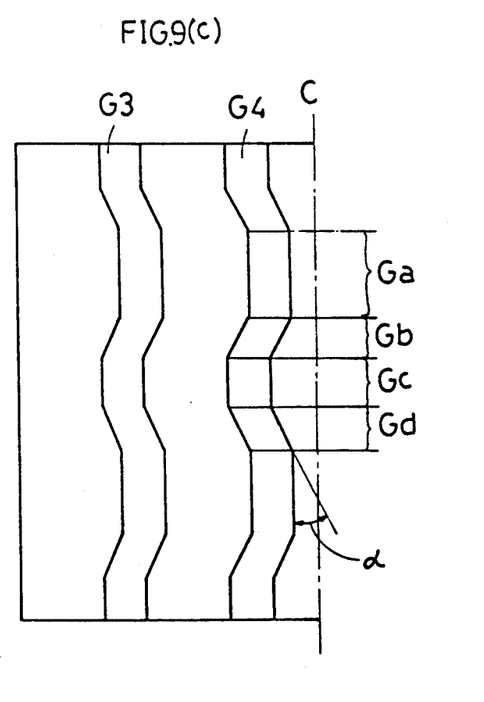

Furthermore, in order to prevent uneven wear of a tire for heavy duty vehicles without lowering the wet grip performance, various proposals such as the Japanese Patent Publication No. 51-15282, Japanese Laid-open Patents Nos. 46-4553, 61-92902, 61-178205, 61-115703, and the U.S. Pat. No. 4,423,760 have been disclosed. But none of them proposes radical countermeasures. For example, in the Japanese Patent Publication No. 51-15282, the main groove dividing the center ribs is designed so as to decrease the width of the center ribs toward the inside in the tire radial direction, that is, the sectional shape of the main groove is designed substantially in a reverse V-form. And also to prevent biting of pebbles, a projecting part is provided in the main groove, whereby the track wear generated in the ribs is decreased. In this case, however, the groove shape is complicated, and there are manufacturing problems. Moreover pebbles may be caught in both side slits in the grooves, and the rib side edges may be broken. On the other hand, as shown in FIG. 9 (a), (b), the wear is excessive in the external angle portion of the zigzag groove, because the rigidity of the external angle portion is lower than that of other parts. Therefore, the external angle portions are worn partially and progressively. As the method of enhancing the rigidity in the external angle portion so as to reduce the uneven wear, as shown in FIG. 9 (c), it is proposed to remove the external angle portion. That is, to form the main grooves G3, G4 by peripheral groove components Ga, Gc parallel to the tire peripheral direction, and oblique groove components Gb, Gd inclining at an angle of α to the tire circumferential direction.

By this method, the reduction of track wear may be achieved, but from the viewpoint of grip performance of the tire, it is necessary to increase the angle α to the circumferential direction of the oblique groove components Gb, Gd, which may sometimes result in the formation of heel-and-toe wear which is often found in the block pattern, near the ridge of the oblique groove components.

As proposed above, when the deflection width of zigzag at the groove bottom is defined larger than that at the tread surface, the track wear of tire is slightly decreased. But the wear still occurs, and in the terminal phase of wear of the tread surface, the wet grip force is extremely lowered, and the brake effect when traveling on a wet road is not perfect.

SUMMARY OF THE INVENTION

It is hence a primary object of the invention to present a radial tire for heavy duty vehicles comprising the zigzag shaped main groove of which deflection width at the groove bottom is greater than that at the tread surface, and also comprising a slot and a siping extending from the slot in the hill part of the wall of the main groove, thereby capable of suppressing the occurrence of track wear, enhancing the wet grip performance and brake effect even in the intermediate or terminal phase of the wear of tread surface, and enhancing the durability of the tire.

According to one aspect of the present invention, a radial tire for heavy duty vehicles having on a tread surface at least a main groove 4 extending in the tire circumferential direction, a slot 9 with a slot width HS of 3 to 6 mm, and a siping 11, wherein:

(a) a groove bottom 3 of said main groove 4 is in a zigzag form having external angle portion M and internal angle portion V repeated alternately at the deflection width hl in the tire axial direction;

(b) a groove upper edge line 8 at which a groove wall of said main groove 4 crosses the tread surface is formed by alternately linking the outer groove upper edge line M1 extending in the tire circumferential direction on the tread surface remotely from the external angle portion M in the tire axial direction, and the inner groove upper edge line V1 extending in the tire circumferential direction on the tread surface remotely from the internal angle portion V in the tire axial direction;

(c) the distance hu in the tire axial direction between the outer groove upper edge line M1 and the inner groove upper edge line V1 is smaller than the deflection width hl of the zigzag;

(d) said groove wall of the main groove 4 comprises hill protrusions 6 having an inclined groove wall part 5 extending from the external angle portion M to the outer groove upper edge line M1;

(e) said slot 9 has an inside wall 10 formed in the inclined groove wall part 5, and the depth DS of the inside wall 10 in the tire axial direction from the inclined groove wall part 5 is increasing gradually inward in the tire radial direction;

(f) said siping 11 has an inside wall 12 formed in the inside wall 10 of the slot 9, and the depth DC of the inside wall 12 in the tire axial direction from the inside wall 10 is constant or increasing gradually inward in the tire radial direction; and (g) some of the hill protrusions 6 contain indented hill protrusions provided with the slot 9 and siping 11.

The groove bottom 3 of the main groove 4 is formed in zigzag, and the distance hu in the tire axial direction from the outer groove upper edge line M1 to the inner groove upper edge line V1 on the tread surface is defined smaller than the deflection width hl of the groove bottom. By this construction, the progress of the track wear becomes gradually less from the early stage to the terminal stage, thereby enhancing the tire durability and the brake effect on the wet road surface.

Furthermore, a slot 9 of which depth DS is gradually increasing downward is provided in the hill protrusion 6 of the main groove, whereby the rubber may move easily in the hill protrusion 6 while traveling. As the result, the track wear decreases dramatically, especially in the terminal phase of wear, while the brake effect is enhanced more. What is more, as the depth DS of the slot 9 is increased gradually downward, decrease of track wear and increase of brake effect become more effective.

In addition, by the slot width HS being is set to be 3 mm or more, the wet grip performance is notably improved. And by defining it under 6 mm, the risk of biting pebbles is eliminated. Furthermore, some of the indented hill protrusion 6 have the siping 11 of which depth DC is the same or increases gradually downward beside the slot, thereby making it much easier to move the rubber of the hill protrusion 6 while traveling, and the track wear is further decreased, and the brake effect is much improved.

Thus, in the radial tire for heavy duty vehicles of the invention, since the constitution is organically and integrally composed, even in the terminal phase of wear of the tread surface, the slot and siping may be remain, and the track wear is suppressed, and the durability may be enhanced, and the brake effect and wet grip may be remarkably improved.

BRIEF DESCRIPTION OF THE DRAWINGS

An embodiment of the present invention will now be described by way of example, referring to the attached drawings, in which;

FIG. 7 (a) to (d) are sectional views showing other examples of the main grooves, FIG. 8 is a graph showing the wet brake test results, FIG. 9 (a), (b) are diagrams schematically showing the state of track wear, FIG. 9 (c) is a diagram proposed as a method of enhancing the tire in rigidity.

DESCRIPTION OF THE PREFERRED EMBODIMENT

In FIGS. 1 to 5, a radial tire for heavy duty vehicles 1 has a tread surface 2 which is provided with a plurality of main grooves 4 continuously extending in the tire circumferential direction, wherein the groove bottom 3 of each of the main grooves 4 is formed in a zigzag form by repeating external angle portion M and internal angle portion V, alternately.

In this embodiment, there are four main grooves 4, so that the tread surface 2 is divided into three center ribs RC between one of the main grooves 4 and two shoulder ribs RS between the main grooves 4 and each tread end edge E. In addition, each of the center ribs RC is provided with lug grooves 21 for linking the main grooves 4, 4.

Each main groove 4 has the groove bottom 3 extending in zigzags as mentioned above, and the groove upper edge line 8 at which the groove wall crosses the tread surface 2 is formed by alternately linking the outer groove upper edge line M1 and the inner groove upper edge line V1. The outer groove upper edge line M1 extends linearly in the tire circumferential direction at the position of the tread surface 2 remote from the external angle portion M in the axial direction. And the inner groove upper edge line V1 extends linearly in the tire circumferential direction at the position of the tread surface 2 remote from the internal angle portion V in the axial direction.

The pitch of zigzag of the groove bottom 3 and the disposition pitch of the inner and outer upper edges line M1, V1 are approximately equal, while the distance hu between the outer groove upper edge line M1 and inner groove upper edge line V1 is formed smaller than the deflection width hl of the groove bottom 3.

Therefore, in the main grooves 4, there are hill protrusions 6 having inclined groove walls 5 extending and inclining outwardly from the external angle portion M to the outer groove upper edge line M1.

Also in the main grooves 4, similar to the inclined groove walls 5, there are inclined groove walls 22 extending and inclining outwardly from the internal angle portion V to the inner groove upper edge line V1. And the groove walls of the main grooves 4 are formed by connecting the inclined groove walls 5 and inclined groove walls 22 of the concave part, alternately.

Figure 1:
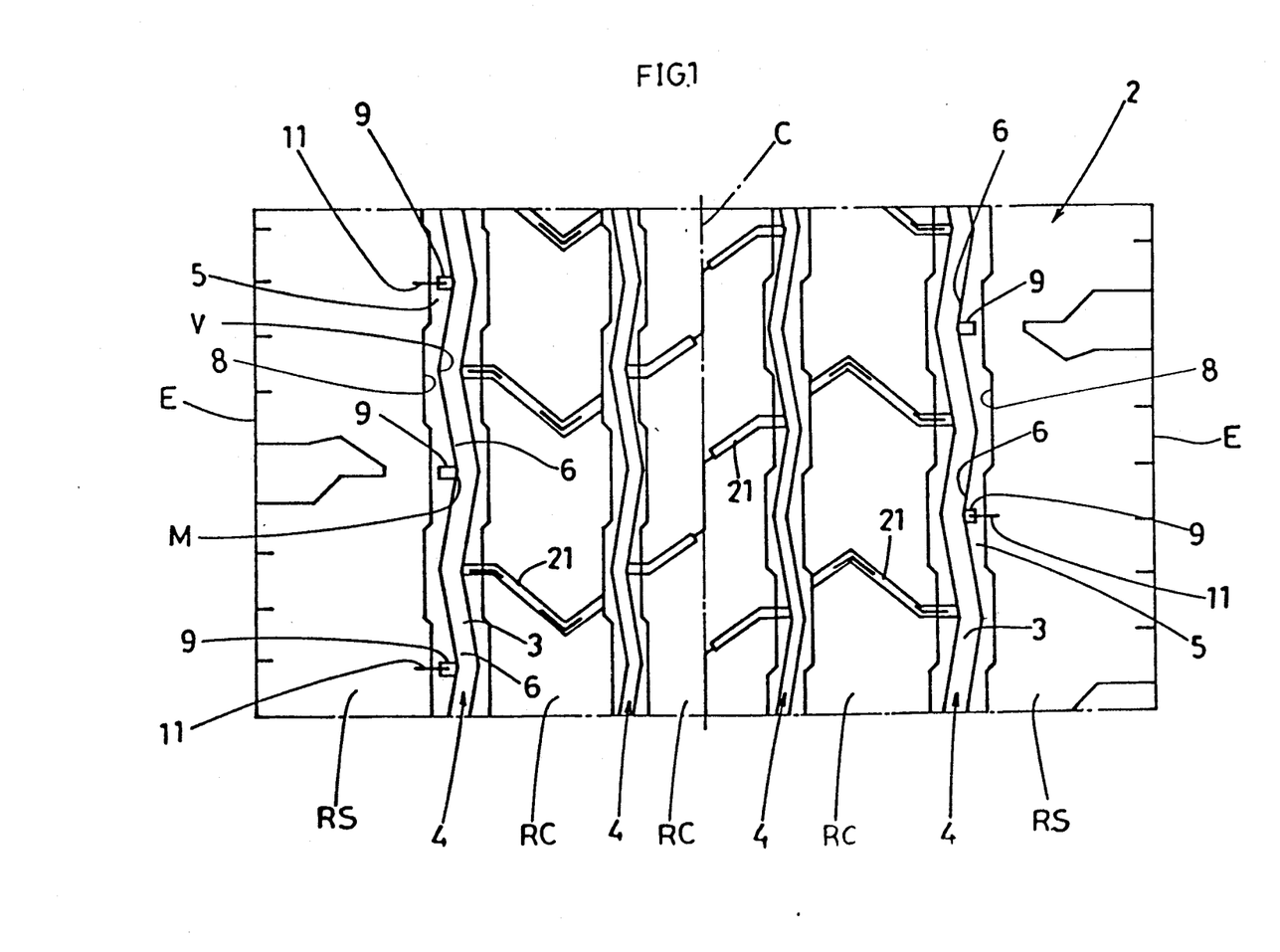
FIG. 1 is a plan view developing the tread surface of a tire of the invention.
Figure 2:
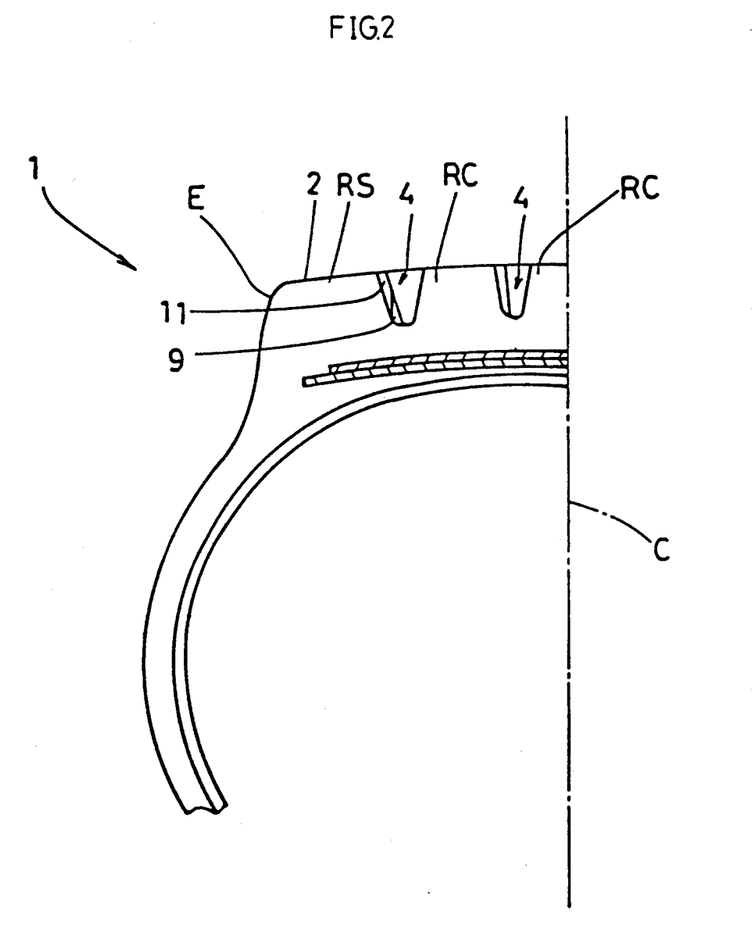
FIG. 2 is a partial sectional view of the same tire.
Figure 3:
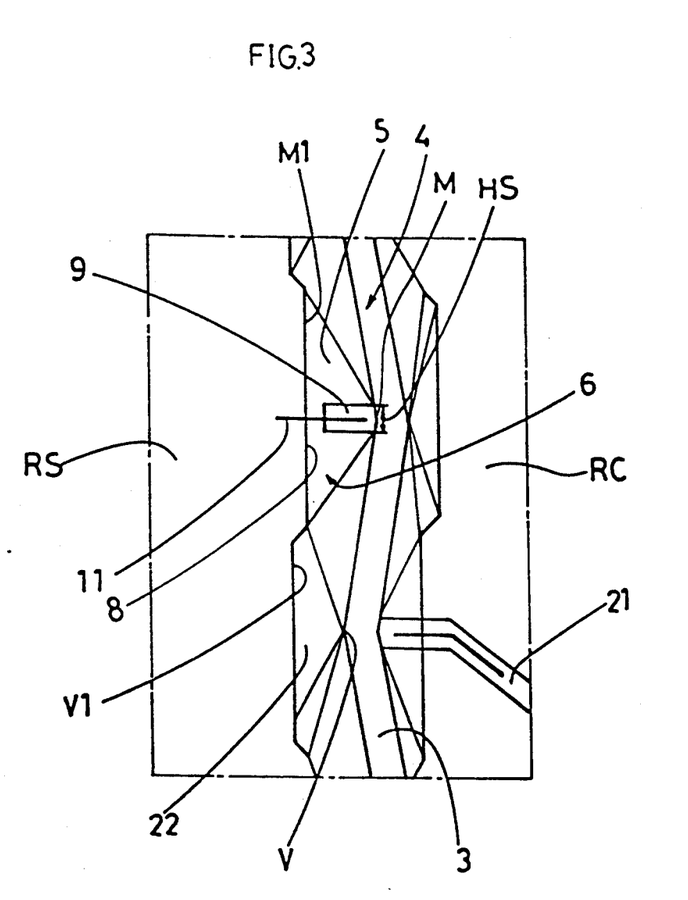
FIG. 3 is a plan view showing an enlarged view of the tread surface.
Figure 4:
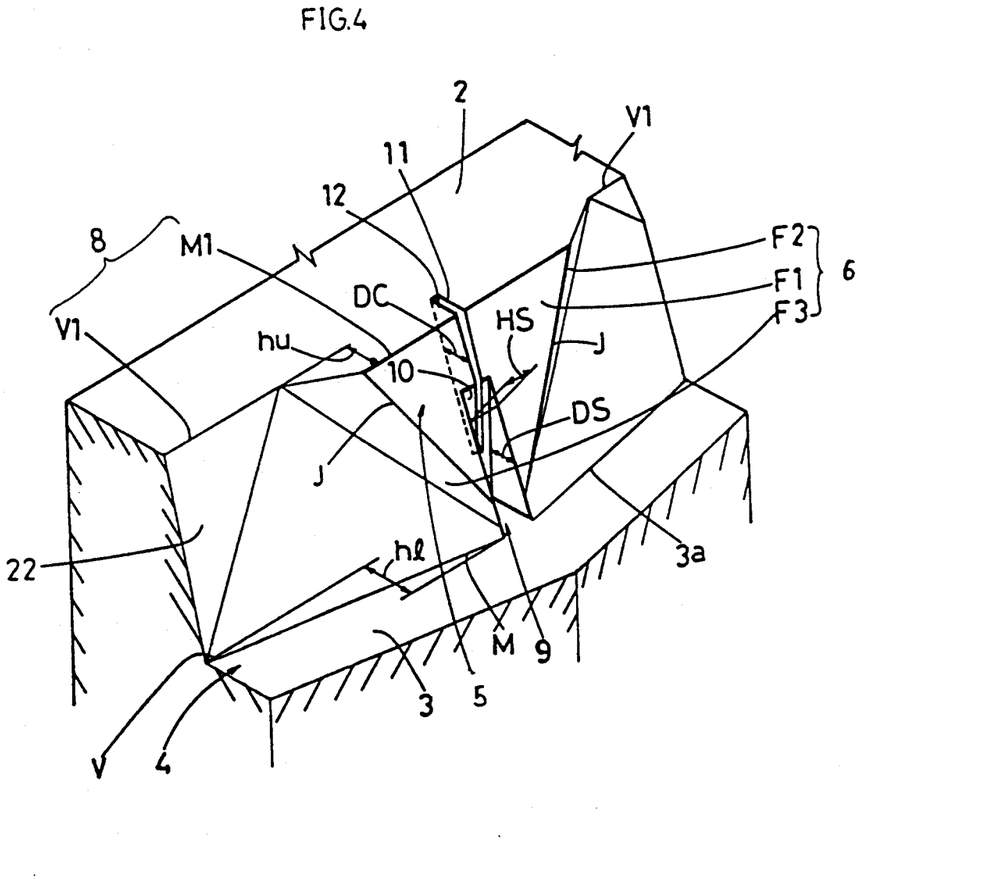
FIG. 4 is a perspective view showing the hill projections.

The hill protrusion 6 is composed of three surfaces F1, F2, F3 including the inclined groove walls 5 divided by the ridge lines J connecting the corner of the external angle portion M and the corner of the groove upper edge line 8.

Figure 5:
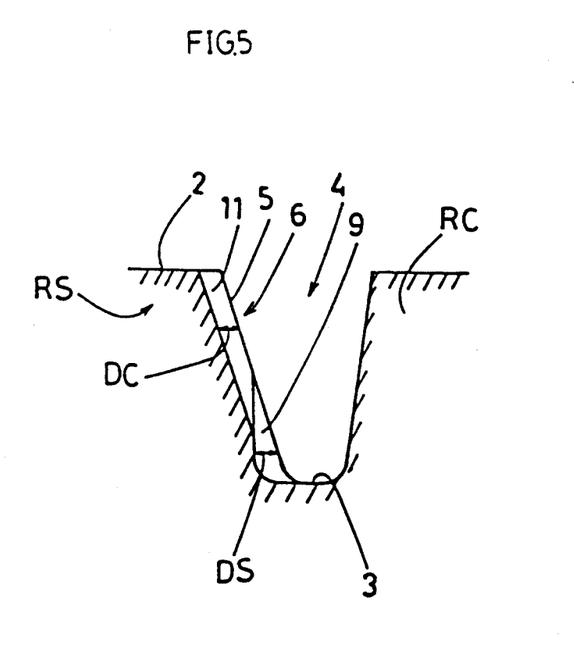
FIG. 5 is a sectional view of A—A of the main grooves.

Further, in this embodiment, a slot 9 is provided in each of the hill projections 6 of the groove wall adjacent to the shoulder rib RS. The slot 9 is, in this embodiment, formed in the inclined groove wall 5 at approximately middle positions in the circumferential direction of the hill projections 6. And it is opened from the middle position in the heightwise direction of the inclined groove wall 5 to the groove bottom edge 3a. Further, the slot width HS is defined in a range of 3 to 6 mm. The inside wall 10 of the slot 9 extends in the direction nearly orthogonal to the tread surface 2 in this embodiment, and therefore the depth DS in the tire axial direction from the inclined groove wall 5 to the inside wall 10 increases gradually downward.

If the slot width HS is less than 3 mm, the wet grip performance is significantly lowered, and if it exceeds 6 mm, the wear of the tread surface 2 is excessive, and pebbles may be caught easily therein.

The inside wall 10 of the slot 9 is provided with a siping 11 which extends in the tire axial direction and opens on the inside wall 10 and the tread surface 2.

In this embodiment, the siping 11 is placed at every other of the slots 9 arranged in the circumferential direction, and the siping 11 has the inside wall 12 nearly parallel to the inside wall 10 of the slot 9.

In this embodiment, therefore, the depth CD from the inside wall 10 to the inside wall 12 is set to be constant through its full length.

It is meanwhile desired to keep the groove width of the siping 11 at 2.0 mm or less. If such groove width exceeds 2.0 mm, when the tread surface 2 contacts with the ground, the press force between both ends of the siping is decreased so as to lower the rigidity of the shoulder rib RS and the wear resistance.

Figure 6:
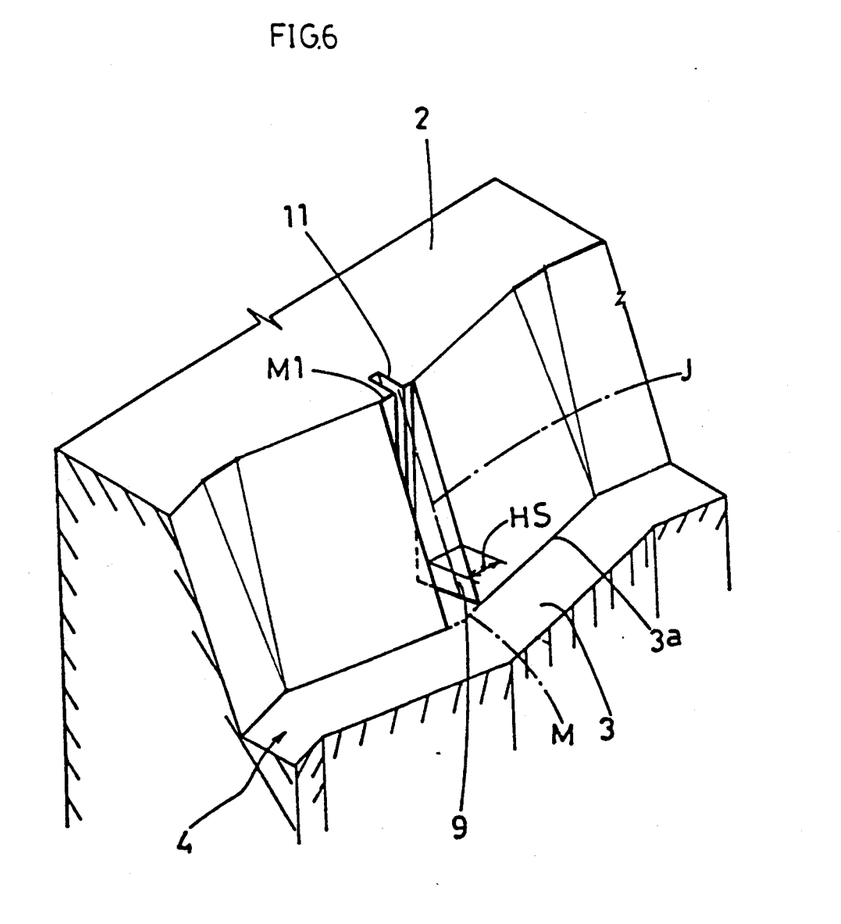
FIG. 6 is a perspective view showing another example of the hill projections.
Figure 7A:
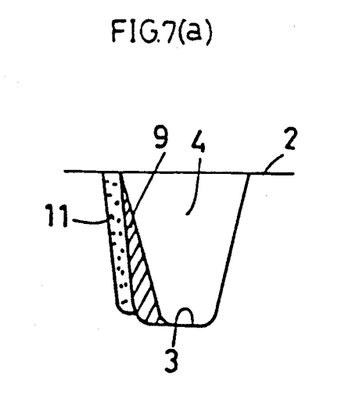
Figure 7B:
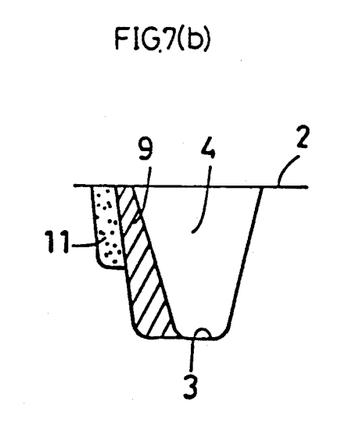
Figure 7C:
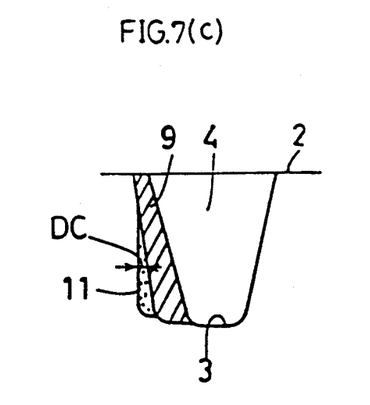
Figure 7D:
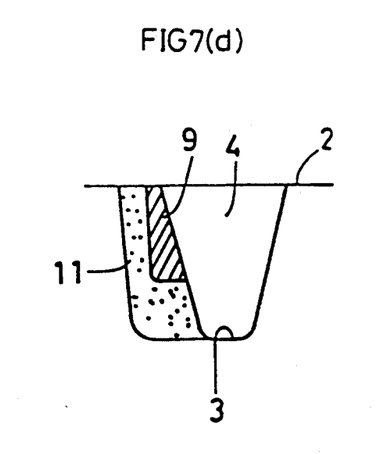

FIG. 6 shows another embodiment of the invention. In FIG. 6, the main groove 4 has a nearly zigzag shaped upper edge line 8 at equal zigzag pitch with the groove bottom 3, and the upper edge lines 8 has also the outer and inner groove upper edge line M1, V1 with short length at the corners. Furthermore, the main groove 4 is provided with the slot 9 which extends from the groove bottom 3 to the tread surface 2 with the slot width HS being equal to the length of the outer groove upper edge line M1. Accordingly, in this embodiment, the slot 9 is formed on the whole surface of the inclined groove wall part 5, and the siping 11 is formed at its center J.

Furthermore, the slot 9 and siping 11 may be formed along the overall height of the inclined groove wall 5 from the groove bottom 3 to the tread surface 2 as shown in FIG. 7 (a). Or as shown in FIG. 7 (b), the slot 9 may be formed along the overall height of the inclined groove wall 5, while the siping 11 may be formed in a range of an intermediate height position of the inclined groove wall 5 from the tread surface 2.

Moreover, as shown in FIG. 7 (c), the siping 11 may be formed in a range from an intermediate height of the inclined groove wall 5 to the groove bottom 3, and the depth DC of the siping 11 may be formed to increase gradually downward, or, as shown in FIG. 7 (d), the slot 9 is formed to an intermediate height of the inclined groove wall 5 from the tread surface 2, while the siping 11 may be formed over the overall height of the inclined groove wall 5 from the tread surface 2 to the groove bottom 3.

Alternatively, the sipings may be formed in all slots, or the slots and sipings of the above composition may be disposed at the hill part of the center rib, and the invention may be modified in various embodiments.

EXAMPLES

A tire (Embodiment) in the tire size of 10.00R20 having the composition as shown in Table 1 was manufactured, and its wet brake performance and track wear amount were tested. For reference, a tire of conventional specification (Comparison 1) and tires of different composition than the invention (Comparisons 2 and 3 in Table 1) were similarly tested.

The test conditions were as follows.

(1) Wet brake performance

The trial tire was mounted on a 2.2-ton capacity truck under the specified maximum load, and the braking distance of the truck accelerated on a wet road surface at a speed from 60 km/H to 80 km/H was measured.

Figure 8:
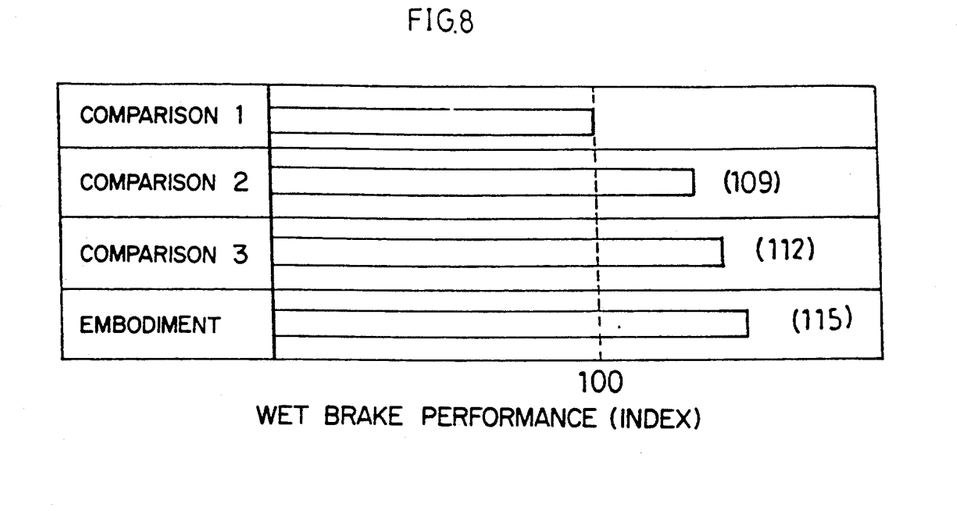

The test results are shown in FIG. 8, in which the inverse number of the measured braking distance was indicated by the index, taking the example 1 as 100. The greater the numerical value, the better is the performance.

(2) Track wear amount

The tire of Embodiment and Comparison 1 to 3 were mounted on rear wheels of a truck consisting of two front wheel tires and four rear wheel tires, and the track wear was measured at every traveling distance of 10,000 km.

Figure 10:
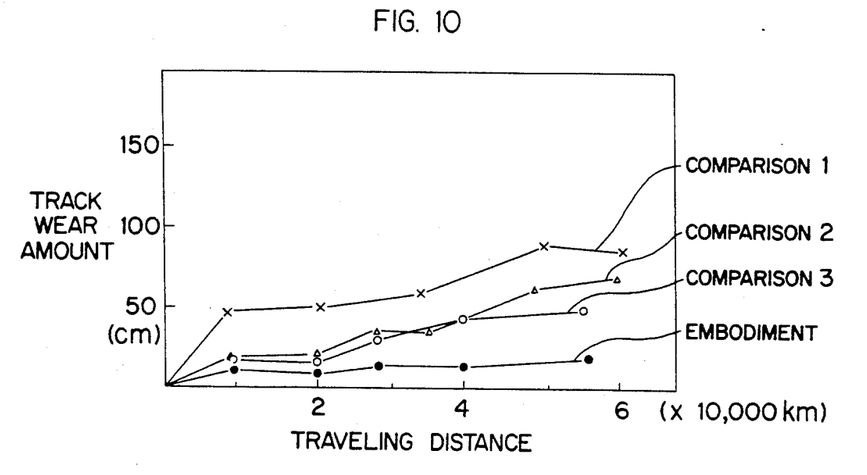
FIG. 10 is a graph showing the relation between the traveling distance and track wear amount.

The wear amount shown in FIG. 10 was calculated by measuring the volume lost (indicated in shaded area in drawing) due to wear as shown in FIG. 9 (a), (b).

(3) Wet grip performance

In the tire as shown in FIGS. 1 to 4 in the tire size of 10.00R20, trial products differing in the slot width of the slot from 1 mm to 9 mm at 1 mm increments were fabricated, and they were mounted on an actual vehicle to run on a wet road surface, and the performance was judged by the feeling of the driver.

Figure 11:
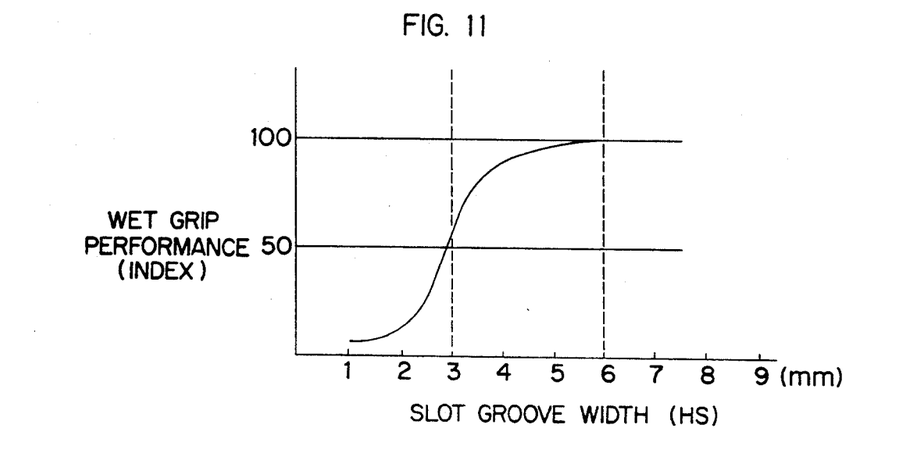
FIG. 11 is a graph showing the relation between the slot groove width and wet grip performance.

The wet grip performance shown in FIG. 11 is indicated by the index, taking the groove width of 3 mm as 50. The greater the numerical value, the better is the performance.

The test results revealed that the composition of the invention with the groove width of 3 mm or more was excellent. When exceeding the groove width of 6 mm, the wet grip performance was unchanged, but there is a possibility of biting pebbles, and the wear of the tread surface may increased. Hence, it is necessary to define the groove width at 6 mm or less.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

| | Specification |
|---|---|
| Comparison 1 | Both groove bottom side and tread surface side in zigzag groove; both groove bottom side and tread surface side in same deflection width. |
| Comparison 2 | Groove bottom side in zigzag, tread surface side in trapezoidal continuous form: deflection width of tread surface side smaller than that of groove bottom side |
| Comparison 3 | In composition in Comparison 2, slots were provided in the inclined side wall of the hill part (without sipings) (NOTE 1) |
| Embodiment: | Composition in FIGS. 1 to 4 of the invention (in Comparison 3, sipings were added on every other position) (NOTE 1) |

NOTE 1)
The groove width of slot is 3 mm in both Comparison 3 and Embodiment.

What is claimed is:

1. A radial tire for heavy duty vehicles having on a tread surface at least one main groove (4) extending in the tire circumferential direction, a slot (9) having a slot width HS in a range of 3 to 6 mm, and a siping (11), wherein:

(a) a groove bottom (3) of said main groove (4) is in a zigzag form having an external angle portion M and an internal angle portion V repeated alternately at the deflection width hl in the tire axial direction;

(b) a groove upper edge line (8) at which a groove wall of said main groove (4) crosses the tread surface is formed by alternately linking an outer groove upper edge line M1 extending in the tire circumferential direction on the tread surface remotely from the external angle portion M in the tire axial direction, and an inner groove upper edge line V1 extending in the tire circumferential direction on the tread surface remotely from the internal angle portion V in the tire axial direction;

(c) the distance hu in the tire axial direction between the outer groove upper edge line M1 and the inner groove upper edge line V1 is smaller than the deflection width hl of the zigzag;

(d) said groove wall of said main groove (4) includes hill protrusions (6) having an inclined groove wall part (5) extending from the external angle portion M to the outer groove upper edge line M1;

(e) said slot (9) is formed on the inclined groove wall part (5), and is open from the middle position in the heightwise direction of the inclined groove wall part (5) to the groove bottom (3);

(f) said slot (9) has an inside wall (10) formed in the inclined groove wall part (5), and the depth DS of the inside wall (10) in the tire axial direction from the inclined groove wall part (5) increasing gradually inward in the tire radial direction;

(g) said siping (11) has an inside wall (12) formed in the inside wall (10) of said slot (9), and the depth DC of the inside wall (12) in the tire axial direction from the inside wall (10) is constant or increasing gradually inward in the tire radial direction; and (h) some of the hill protrusions (6) contain indented hill protrusions provided with the slot (9) and said siping (11).

* * * * *